United States Patent Office 3,551,479
Patented Dec. 29, 1970

3,551,479
SULFONIC ALKYLENE ESTERS OF ITACONIC
AND ALPHA-METHYLENE GLUTARIC ACIDS
AND HOMOPOLYMERS THEREOF
William D. Emmons, Huntingdon Valley, Pa., assignor to Rohm & Haas Company, Philadelphia, Pa., a corporation of Delaware
No Drawing. Filed Mar. 20, 1967, Ser. No. 624,170
Int. Cl. C08f *13/00;* C07c *69/60, 69/62*
U.S. Cl. 260—485            3 Claims

ABSTRACT OF THE DISCLOSURE

This invention relates to polymerizable emulsifying agents having both a hydrophilic ester radical portion and a hydrophobic ester radical portion that are chemically bound to the polymer in such a manner as to prevent migration of the emulsifying agent on coagulation and provide an internally stabilized polymer. The polymerizable emulsifying agents of this invention are anionic α,β-unsaturated dicarboxylic acid substituted esters having a hydrophilic sulfo-ester radical portion alpha to or conjugated with a polymerizable double bond and a hydrophobic ester radical portion beta to or unconjugated with the polymerizable double bond. Polymer dispersions formed according to this invention may be used in the preparation of adhesives, coatings, impregnating and dispersing compositions.

---

This invention relates to novel polymerizable surface active compounds having both a hydrophilic ester radical portion and a hydrophobic ester radical portion, to methods for their preparation, and to internally stabilized homopolymers and copolymers formed therefrom. In particular, this invention relates to anionic polymerizable α,β-unsaturated dicarboxylic acid substituted esters having an internal structural mechanism for predetermining their hydrophile-lyophile balance and capable of polymerically combining with copolymerizable ethylenically unsaturated compounds dispersed in an aqueous medium to provide a very stable latex containing polymer particles comprising the anionic polymerizable surfactant as an immobile integral component of the polymer.

The advantages of using an emulsifying agent that is bound to the polymer in such a manner as to prevent migration of the dispersing agent on coagulation and thus avoid the difficulties encountered in the use of soap as an emulsifying agent are described in U.S. Pat. 2,868,755. Emulsifying agents such as soap have been extensively used in water as a dispersing agent. Suitable initiating agents are added to this emulsion of the monomer in water, which results in the formation of polymer particles, which are protected from coagulation by a layer of adsorbed emulsifying agent. The dispersion of such protected polymer particles is termed a synthetic latex. The emulsifying agent thus functions initially to dissolve the monomer in the micelles formed in the dispersing medium and subsequently to protect the polymer particles so formed. Soaps, such as potassium laurate and sodium abietate, etc., are in no case chemically bound to the polymer but are simply adsorbed on the surface of the polymer particles and when the resulting latex is coagulated, as for example by adding acids or multivalent cations, the emulsifying agent contributes little to the strength or adhesion of the coagulated polymer, but instead may itself, or by virtue of the decomposition products formed, continue to insulate the particles from one another in the coagulum. The reaction product of the prior emulsifying agents with certain coagulating agents migrates within the solid polymer to form aggregates which further weaken the mechanical properties of the polymer. When the latex is evaporated as a film, migration of the emulsifying agent to the surface of the film has a deleterious effect upon several properties such as adhesion and resistance to water-spotting.

The prior art discloses the use of sulfo-esters of monocarboxylic acids of the formula

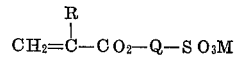

where R is hydrogen, a halogen atom or an organic radical, Q is a bivalent organic radical having its valence bonds on two different carbon atoms, such as an alkylene radical, and M is hydrogen, an ammonium base or a metal, to form interpolymers with different polymerizable ethylenically unsaturated compounds. It has been disclosed that the incorporation of the carboxylic acid sulfo-ester in a hydrophobic ethylenically unsaturated monomer provides a copolymer having an increase in hydrophilic properties. The degree of variation of the hydrophilic properties is directly related to the percent by weight of the carboxylic acid sulfo-ester in the monomer mixture.

In accordance with this invention, it has been discovered that certain polymerizable ethylenically unsaturated compounds, comprising a hydrophilic sulfo-ester radical portion in an alpha or conjugated relationship to a polymerizable double bond together with a hydrophobic ester radical portion in a beta or unconjugated relationship with the polymerizable double bond, of the formula (I)
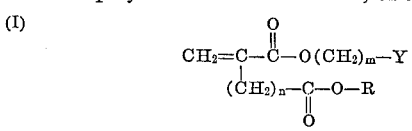

where m is an integer from 2 to 4, n is an integer 1 or 2, R is a $C_1$–$C_{22}$ alkyl radical, a radical having the structure —$CH_2(CF_2)_xH$ where x is an even integer from 2 to 10, or a radical having the structure

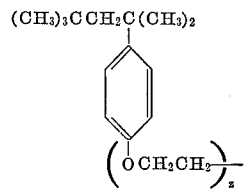

where z is an integer from 1 to 40 and Y is —$S(O_2)OM$, where M is hydrogen, ammonia or an alkali metal, can be structurally adapted to provide a predetermined hydrophile-lyophile balance merely by changing the structure of the hydrophobic ester radical, R, which is bound to the carboxyl group beta to or unconjugated with the polymerizable double bond. The net balance of the hydrophilic properties imparted by the electronegative —Y substituent and the hydrophobic properties imparted by —R may be predetermined by carefully selecting the —R and —Y substituents.

The compounds of this invention may be sequentially prepared because of the substantial differential in reactivity of the carboxyl groups in the conjugated and unconjugated positions of the dicarboxylic acids used as starting materials. For example, itaconic acid possesses one carboxyl group that is more susceptible to a nucleophilic attack than is the other carboxyl group. Thus, the mono-alkyl itaconate is first formed with the hydrophobic ester radical R bound to the carboxyl group in the unconjugated position. The mono-alkyl itaconate is then reacted with a base, such as potassium hydroxide, and then propane sultone to form the sulfo-ester. The following reaction sequence is representative of the preparation of the compounds of this invention:

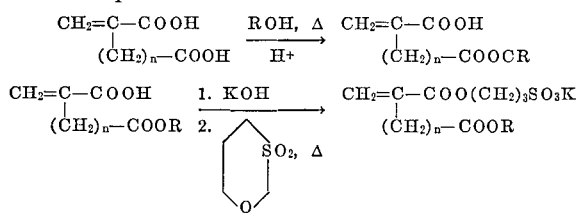

where R and $n$ are as defined above.

The anionic sulfo-esters of $\alpha,\beta$-disubstituted dicarboxylic acids of this invention are incorporated into aqueous emulsion polymerization systems either with or without other emulsifying agents wherein they function as emulsion stabilizers and are polymerized into the polymer chain to provide a stable latex of polymer particles comprising the anionic polymerized surfactant as an immobile integral component of the polymer. When the compounds of this invention are incorporated into the polymer chain in a proportion from about 0.05 percent to about 5.0 percent by weight, based on the weight of the monomer mixture, the resulting latex is characterized by good stability, very low foaming properties and excellent pigment compatibility. Emulsion polymers heretofore made with ordinary emulsifiers having the same backbone and particle size as emulsion polymers comprising the polymerized surfactants of this invention do not possess the desirable characteristics noted above. For example, when air is blown through latices prepared with the compounds of this invention and similarly blown through latices prepared with saturated, physically adsorbed emulsifiers according to the procedure described below, the latices of this invention exhibit significantly lower foaming characteristics. The following Table I represents the results of a foaming test where latices of this invention are compared with latices using conventional emulsifiers. In one instance a polymerizable compound of this invention is used (latex A); in a second instance a saturated analog of the same polymerizable compound is used (latex B), and in a third instance a conventional prior art emulsifying agent is used (latex C). The degree of foaming is represented by the time required for the head of foam, generated by air bubbling through a 1 mm. orifice at 40 ml./min. rate into 20 ml. of the emulsion placed in a 100 ml. graduated cylinder, to reach the 100 ml. mark.

Representative of the polymerizable dicarboxylic acids that may be used as starting materials to make the monomeric mixed esters of the present invention are itaconic acid, $\alpha$-methyleneglutaric acid, maleic acid, fumaric acid, and other polymerizable mono-olefinic dicarboxylic acids.

Representative of the polymerizable ethylenically unsaturated compounds that can be copolymerized with the polymerizable surface active mixed esters of this invention are the styrene compounds, the ethylenically unsaturated acids and derivatives such as the acrylic and methacrylic acids and salts, acrylic and methacrylic esters, acrylic and methacrylic nitriles, acrylic and methacrylic amides, acrylic and methacrylic anhydrides, maleic esters, maleic anhydride, maleic acid polyesters, unsaturated alcohol esters, unsaturated ketones, unsaturated ethers, and other compounds containing one or more ethylenic linkages capable of addition polymerization. Specific examples of such ethylenically unsaturated compounds are ethylene, styrene, $\alpha$-methylstyrene, vinylnaphthalene, vinylbenzenesulfonic acid, hydroxystyrene, methoxystyrene, aminostyrene, cyanostyrene, acetylstyrene, monochlorostyrene, dichlorostyrene and other halostyrenes, acrylic acid and salts, methacrylic acid and salts, methyl methacrylate, ethyl acrylate, hexyl acrylate, lauryl methacrylate, phenyl acrylate, allyl acrylate, acrylonitrile, methacrylonitrile, acrylamide, methacrylamide, acrylanilide, acrylic anhydride, ethyl $\alpha$-chloroacrylate, ethyl maleate, maleic anhydride, polyglycol maleate, diallyl fumarate, vinyl acetate, vinyl propionate, vinyl butyrate, vinyl benzoate, vinyl chloride, vinyl bromide, vinylidene chloride, vinylidene bromide, vinylidene cyanide, vinyl methyl ketone, methyl isopropenyl ketone, vinyl carbazole, vinyl ethyl ether, isobutylene, 1,3-butadiene, isoprene, and the like.

The improved polymers of this invention may be prepared by conventional methods of emulsion polymerization. In most instances the starting composition is agitated and the temperature is raised, e.g., to a temperature in the range from 40° C. to 100° C. to activate the polymerization, although in some instances, particularly those wherein the composition comprises a very active polymerization catalyst, the polymerization can occur at or below room temperature.

The invention contemplates embodiments in which all of the constituents are charged to the starting mixture, and are polymerized therein in a single step, as well as embodiments in which the constituents are charged in a

TABLE I

| Latex | Emulsifying Agent | Amount of foam | Total collapse of foam, sec. |
|---|---|---|---|
| A | 1 wt. percent potassium mono-lauryl itaconoxy-propane sulfonate. | 80 ml./600 sec | 70 |
| B | 1 wt. percent potassium mono-lauryl succinoxy-propane sulfonate. | 100 ml./86 sec | 240 |
| C | 1 wt. percent sodium lauryl sulfate | 100 ml./90 sec | 150 |

Additional support for the statement of advantageous properties possessed by the latices of this invention is based upon the behavior of latices A, B, and C in Table I when they are each independently mixed with a pigment paste consisting of $TiO_2$ and water. The latex formed with the polymerizable emulsifier of this invention, latex A, when mixed with the pigment paste forms a thin thixotropic emulsion that slowly thickens on standing, but upon stirring it becomes fluid and free-flowing. The mixture of latex B and the pigment paste coagulates completely in 60 seconds. The mixture of latex C and the pigment paste coagulates completely in less than 30 seconds.

The hydrophilic sulfo-ester radical portion of the compounds of this invention forms salts with ammonium bases, such as ammonia and organic amines and with inorganic bases such as the alkali metal hydroxides.

sequence, perhaps coordinated with a polymerization sequence, and/or the polymerization is carried out in plurality of stages.

The invention contemplates that the aqueous starting composition comprising the polymerizable material may contain polymerization catalysts of kinds already known to promote emulsion polymerizations. Among such catalysts are water-soluble oxidizing agents such as hydrogen peroxide and potassium persulfate and catalysts which, like the redox catalysts, are activated in the water phase, e.g., by a water-soluble reducing agent.

The invention contemplates that the aqueous composition may optionally contain conventional emulsifiers, wetting agents, surfactants, and the like, although such constituents can be omitted from the starting composition and, if used, can usually be employed in smaller proportions in accordance with this invention than is possible with known processes.

These aqueous dispersions are characteristically very stable, i.e., resistant to coagulation of the colloidally dispersed polymer particles, even though they contain little or no conventional emulsifier or stabilizer. In many instances, the polymer dispersions can be mixed with concentrated calcium chloride solutions without causing coagulation of the polymer. In many instances, the dispersion can be vigorously agitated without coagulation under conditions that cause substantial precipitation of ordinary dispersions. In instances where the dispersions contain little or no conventional water-soluble emulsifier, the dispersions often have little or no tendency to foam. When the polymer dispersions are obtained from starting compositions that were substantially free of water-soluble soaps, wetting agents, stabilizers, and like external solutes, the resulting polymer dispersions are likewise substantially free of such external solutes and are advantageously employed where such solutes are undesirable, e.g., in coatings that are resistant to water.

The latex products, i.e., aqueous polymer dispersions, obtained in accordance with this invention are useful for a number of purposes. For example, some of the latex dispersions are useful in the preparation of adhesives, coating, impregnating and dispersing compositions, or in the coating of films and the like. Other compositions can be treated, e.g., by spray or other drying, to obtain a dry polymeric product useful in molding or for other purposes. The compounds of this invention may also be used as antistatic agents for textiles and plastics, as sizing agents and as dye assistants.

To assist those skilled in the art to practice this invention the following modes of operation are suggested by way of illustration, parts and percentages being by weight and the temperatures in degrees C. unless otherwise specifically noted.

(1) PREPARATION OF MONO-ESTER

A mixture of about 390 gm. itaconic acid (3.0 moles), about 558 gm. n-lauryl alcohol (3.0 moles), about 300 ml. xylene, and about 3 ml. acetyl chloride is refluxed until about 54 ml. water is removed. The reaction mixture is cooled to 5° C. and filtered to provide about 635 gm. of white, crystalline lauryl hydrogen itaconate which is recrystallized from ligroin to a constant melting point of 74–75° C.

(2) PREPARATION OF MIXED HYDROPHILE-HYDROPHOBE

To a mixture of about 298 gm. of the lauryl hydrogen itaconate, formed in procedure (1) above, about 0.5 gm. hydroquinone and about 50 ml. tert-butanol is added, with stirring, a suspension of about 56 gm. potassium hydroxide in about 500 ml. tert-butanol. The reaction mixture is heated to reflux and a solution of about 122 gm. propane sultone in about 50 ml. of tert-butanol is added slowly and the mixture is refluxed for about 2–3 hours. The solvent alcohol is then removed in vacuo and and the residue dried to provide about 445 gm. of off-white waxy potassium mono-laurylitaconoxypropane sulfonate (K–LIOPSA).

(3) POLYMERIZATION WITH POLYMERIZABLE EMULSIFIER

To a mixture consisting of about 90 gm. of a mixture of monomeric material consisting of ethyl acrylate, methyl methacrylate, and methacrylic acid in the weight ratios of 60/30/2, about 550 gm. deionized water and about 0.45 gm. of the potassium mono-laurylitaconoxypropane sulfonate formed in procedure (2) above is added about 3 gm. potassium persulfate. The polymerization reaction is initiated at about 75° C., after a 15 minute nitrogen sparge. After a one minute induction period and about thirty minutes at 80° C. about 535 gm. ethyl acrylate, about 265 gm. methyl methacrylate, about 10 gm. methacrylic acid, about 550 gm. deionized water, and about 8.5 gm. potassium mono-laurylitaconoxypropane sulfonate are added to the seed polymer over about a two hour period. The polymerization reaction is continued at about 75°–80° C. for an additional 0.5 hour to insure completion. The gum-free polymer product obtained has a solids content of about 45%, a final pH about 2.8, and a particle size of about 0.32 micron ±0.02μ.

The latex formed in procedure (3) above exhibits a relatively high surface tension and low foaming properties when tested in accordance with the method described for Table I above.

When about 100 ml. of the latex formed in procedure (3) above, having a pH adjusted to 6.8 with 10% aqueous KOH, is mixed with a pigment consisting of about 45 gm. Rutile 610 grade $TiO_2$ and about 30 gm. water and stirred for 1–2 minutes, a thin thixotropic emulsion is obtained.

(4) PREPARATION OF MONO-ESTER

A mixture of 26 gm. itaconic acid (0.2 mole), 106 gm. 1H,1H,11H-eicosafluoroundecyl alcohol (0.2 mole) and 0.4 gm. concentrated sulfuric acid (2 mole percent) in 100 ml. toluene is refluxed to remove about 3.6 gm. of water. The reaction mixture is cooled to 5° C. and filtered to provide about 120 gm. of crystalline 1H,1H,11H-eicosafluoroundecyl hydrogen itaconate which is recrystallized from ligroin to a melting point of 100–102° C.

(5) PREPARATION OF MIXED HYDROPHILE-HYDROPHOBE

To a mixture of 32.2 gm. (0.05 mole) of the product formed in procedure (4) above, 0.5 gm. hydroquinone and 50 ml. tert-butanol is added, with stirring, a suspension of 2.8 gm. potassium hydroxide in 50 ml. tert-butanol. The reaction mixture is heated to reflux and a solution of 6 gm. (0.05 mole) propane sultone in 50 ml. tert-butanol is added slowly and the mixture is refluxed for about 2–3 hours. The solvent alcohol is then removed in vacuo and the residue dried to provide about 39 gm. of potassium mono - (1H,1H,11H - eicosafluoroundecyl)-itaconoxypropane sulfonate having the formula

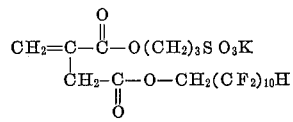

(6) POLYMERIZATION WITH POLYMERIZABLE EMULSIFIER

To a mixture of 45 gm. ethyl acrylate, 45 gm. methyl methacrylate, 550 gm. deionized water and 0.45 gm. of the product formed in procedure (5) above is added about 3 gm. potassium persulfate. The polymerization is initiated at about 75° C. after a 15 minute nitrogen sparge. After a one-minute induction period and heating for 30 minutes at about 80° C. about 405 gm. ethyl acrylate, about 405 gm. methyl methacrylate, about 550 gm. deionized water and about 8 gm. potassium mono-(1H,1H,11H - eicosafluoroundecyl)itaconoxypropane sulfonate are added to the seed polymer over about a two hour period. The polymerization reaction is continued at about 75–80° C. for an additional 0.5 hour to insure completion.

(7) PREPARATION OF MONO-ESTER

A mixture of 14 gm. α-methyleneglutaric acid, 27 gm. stearyl alcohol and about 0.5 gm. acetyl chloride in 50 ml. toluene is refluxed to remove about 2 gm. water. The reaction mixture is cooled to 5° C. and filtered to provide about 35 gm. of crystalline stearyl hydrogen α-methyleneglutarate.

(8) PREPARATION OF MIXED HYDROPHILE-HYDROPHOBE

To a mixture of 39.6 gm. (0.1 mole) of the product formed in procedure (7) above, 0.5 gm. hydroquinone and 50 ml. t-butanol is added, with stirring, a suspension of 5.6 gm. potassium hydroxide in about 500 ml. t-butanol. The reaction mixture is heated to reflux and a solution of 12 gm. (0.1 mole) propane sultone in 50 ml. t-butanol is added slowly and the mixture is refluxed for about 2–3 hours. The solvent alcohol is then removed in vacuo and the residue dried to provide about 52 gm. of potassium mono - stearyl α - methyleneglutaroxypropane sulfonate.

(9) POLYMERIZATION WITH POLYMERIZABLE EMULSIFIER

To a mixture of 45 gm. styrene, 45 gm. ethyl acrylate, 550 gm. deionized water and 0.45 gm. of the product formed in procedure (8) above is added about 3 gm. potassium persulfate. The polymerization is initiated at about 75° C. after a 15 minute nitrogen sparge. After a one-minute induction period and heating for 30 minutes at about 80° C. about 405 gm. styrene, 405 gm. ethyl acrylate, 550 gm. deionized water and 8 gm. potassium mono-stearyl α-methyleneglutaroxypropane sulfonate is added to the seed polymer over a two hour period. The polymerization reaction is continued at about 75–80° C. for an additional 0.5 hour to insure completion.

What is claimed is:
1. A compound having the formula:

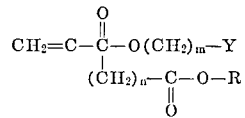

where $m$ is an integer from 2 to 4, $n$ is an integer 1 or 2, R is a radical having the structure $-CH_2(CF_2)_xH$ where $x$ is an even integer from 2 to 10, or a radical having the structure

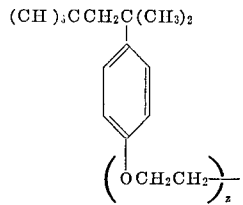

where $z$ is an integer from 1 to 40 and Y is $-S(O_2)OM$, where M is hydrogen, or an alkali metal.

2. A compound as defined in claim 1 wherein $m$ is 3, $n$ is 1 and Y is the radical $-S(O_2)OK$.

3. A compound as defined in claim 2 wherein $n$ is 2.

References Cited

UNITED STATES PATENTS

| | | | |
|---|---|---|---|
| 3,147,301 | 9/1964 | Sheetz | 260—485 |
| 3,359,305 | 12/1967 | Sheetz | 260—486 |

FOREIGN PATENTS

| | | | |
|---|---|---|---|
| 229,029 | 8/1963 | Austria | 260—78.5 |
| 234,380 | 6/1964 | Austria | 260—78.5 |

JOSEPH L. SCHOFER, Primary Examiner

C. A. HENDERSON, JR., Assistant Examiner

U.S. Cl. X.R.

117—139.5, 161; 260—29.6, 78.4, 78.5, 79.3, 513